United States Patent [19]

Lawrence

[11] Patent Number: 4,879,567
[45] Date of Patent: Nov. 7, 1989

[54] CARRIAGE COUPLING DEVICE SYSTEM FOR PEN PLOTTER
[75] Inventor: James Lawrence, Irvine, Calif.
[73] Assignee: Sanders Associates, Inc., Nashua, N.H.
[21] Appl. No.: 86,846
[22] Filed: Aug. 19, 1987
[51] Int. Cl.[4] .......................... G01D 15/16; F16C 21/00
[52] U.S. Cl. ................................ 346/139 R; 384/126; 384/517; 384/618
[58] Field of Search .................... 346/139 R; 384/126, 384/517, 618, 121, 124, 194, 195, 169, 452, 453

[56] References Cited
U.S. PATENT DOCUMENTS
3,900,853  8/1975  White ............................... 346/139 R
4,173,376 11/1979  Standing ............................. 384/517

Primary Examiner—E. A. Goldberg
Assistant Examiner—Mark Reinhart
Attorney, Agent, or Firm—Donald A. Streck; Wm F. Porter, Jr.

[57] ABSTRACT

A low-friction, low-play bearing system for use in a carriage coupling drive system for a pen plotter including a moving carriage slidably mounted on a shaft between the ends of and carrying a U-shaped pen-carrying yoke in combination therewith for sliding motion along the shaft and rotary motion about the shaft. A pair of annular ball-bearing thrust bearings are disposed over the shaft between respective ends of the U-shaped yoke and the moving carriage. An annular bias spring such as a wave spring is disposed over the shaft between the moving carriage and one of the thrust bearings to create a longitudinal expansion force resisting play between the moving carriage and the U-shaped yoke.

9 Claims, 1 Drawing Sheet

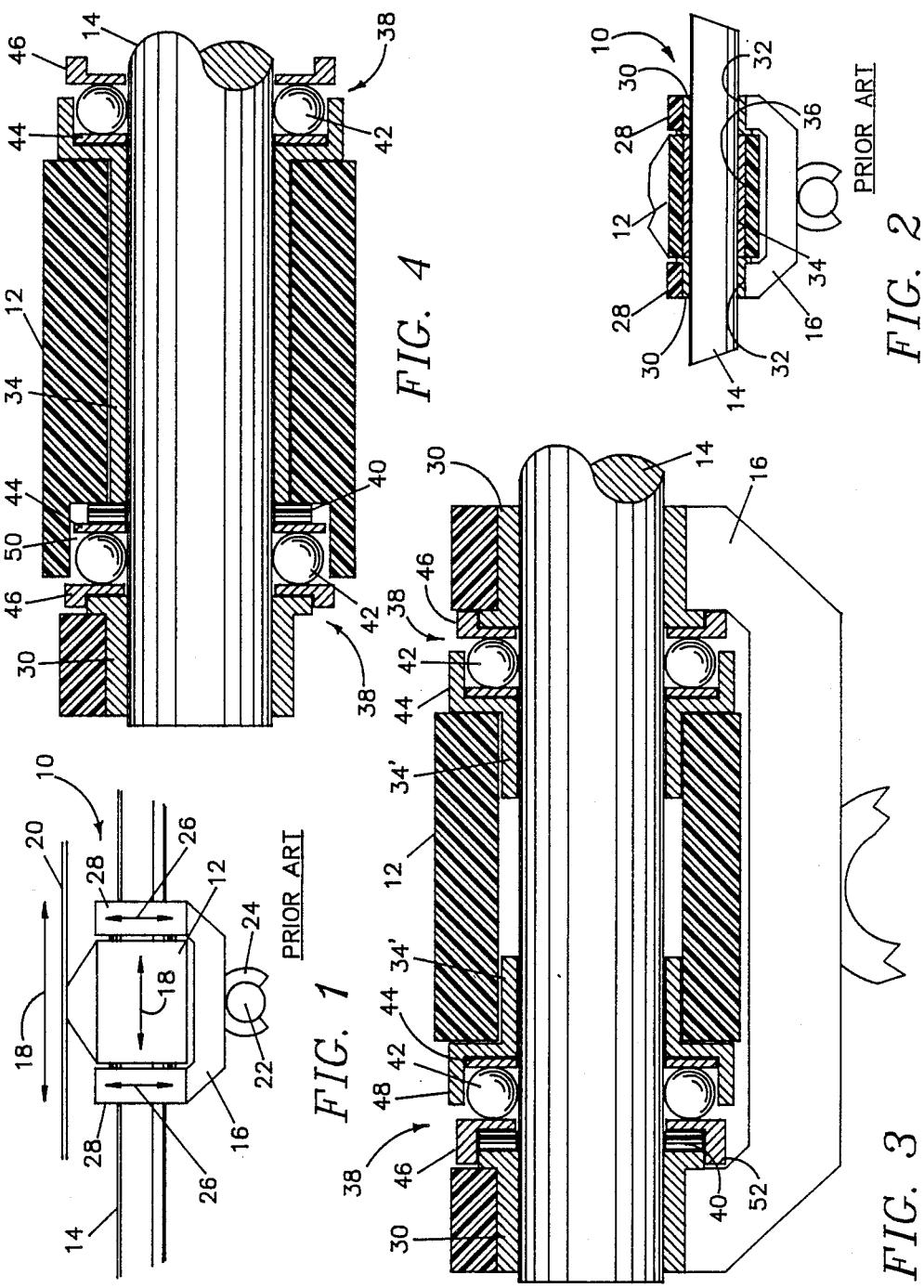

CARRIAGE COUPLING DEVICE SYSTEM FOR PEN PLOTTER

BACKGROUND OF THE INVENTION

The present invention relates to pen plotters and, more particularly, in a carriage coupling drive system for a pen plotter including a moving carriage slidably mounted on a shaft between the ends of and carrying a U-shaped pen-carrying yoke in combination therewith for sliding motion along the shaft and rotary motion about the shaft, to the improved low-friction, low-play bearing system comprising, a pair of annular ball-bearing thrust bearings disposed over the shaft between respective ends of the U-shaped yoke and the moving carriage; and, annular bias spring means disposed over the shaft for creating a linear expansion force resisting play between the moving carriage and the U-shaped yoke.

Pen plotters are well known in the art. As depicted in FIG. 1, a typical prior art pen plotter includes a carriage coupling drive system, generally indicated as 10, wherein a moving carriage 12 is slidably mounted on a shaft 14 between the ends of and carrying a U-shaped pen-carrying yoke 16 in combination therewith for sliding motion along the shaft 14 and rotary motion about the shaft 14. The carriage 12 is moved laterally back and forth as indicated by the arrows 18 by means of a drive tape 20 attached thereto. The tape 20 is driven by a motor drive (not shown) to create one axis of a plot. The pen-carrying yoke 16, of course, moves with the carriage 12 carrying a pen 22 in jaws 24 which are formed into the yoke 16. The pen 22 creates the actual lines on the plot by being raised and lowered through rotation of the yoke 16 about the shaft 14 as indicated by the arrows 26. In the raised position, the pen 22 can be moved from place to place laterally along the shaft 14 without contacting the drawing paper (not shown) being moved thereunder to create the other axis of the plot. In the lowered position, the pen 22 contacts the paper so that the combined movement of the pen 22 and the paper causes the pen 22 to draw line vectors along the two axes of the plot.

Prior art carriage coupling drive systems such as that indicated as 10 in FIG. 1 have accomplished the pen-up and pen-down operations in what can be referred to as a bangbang mode; that is, an electric solenoid is mechanically connected to drive the pen 22 down (i.e. rotate the yoke 16 about the shaft 14) against the bias of a spring (not shown) which raises the pen 22 when the solenoid is de-energized. Thus, the pen 22 (and yoke 16) has two extreme position - full up and full down. In such an operational mode, a bearing system such as that shown in FIG. 2 is quite adequate. The ends 28 of the U-shaped yoke 16 are fitted with sleeve bearings 30 fitted into bores 32 through the ends 28 provided for the purpose. Another sleeve bearing 34 is disposed in a longitudinal bore 36 through the carriage 12. The sleeve bearing 34 is of a length to be a slide fit between the two sleeve bearings 30. As thus configured, the bearings can be operated in a dry condition while affording reasonably acceptable levels of friction and resistance to movement in the longitudinal and rotary directions and resisting longitudinal play between the parts which could produce errors in the plot being created. It should be understood that the example of FIG. 2 is representative only and that prior art plotter carriage drive systems have a variety of configurations.

The foregoing generalities notwithstanding, one aspect of prior art carriage drive system design that has remained a problem is the tradeoff between friction and factors such as line quality and plotter throughput. Typically, the design of prior art systems has been line quality driven with the end result being a reduction in plotter throughput. The explanation for this is simple. If the longitudinal clearances are made tight enough to reduce slop, the friction is too high and parts may bind up in the presence of high temperatures causing the parts to expand. Thus, it is more typical in the prior art to provide a clearance fit and externally spring bias the moving carriage 12 towards one side of the yoke 16 or the other. The carriage drive system as thus configured has the required friction/slop features; but, must be decelerated and allowed to stabilize before plotting can begin. Thus, the plotter throughput is diminished. If the carriage drive system were moved rapidly to a new point, stopped, and plotting begun immediately before longitudinal stabilization of the moving carriage 12 relative to the yoke 16 had taken place, the line quality, of course, would suffer.

Wherefore, it is the object of the present invention to provide an improved carriage coupling drive system for a pen plotter having no longitudinal play between the components while having very low friction with respect to rotary motion between the same components.

It is another object of the present invention to provide an improved carriage coupling drive system for a pen plotter which does not require deceleration to allow the components time to longitudinally stabilize before plotting.

Other objects and benefits of the present invention will become apparent from the description which follows hereinafter taken in combination with the drawing figures which accompany it.

SUMMARY

The foregoing object has been accomplished in a carriage coupling drive system for a pen plotter including a moving carriage slidably mounted on a shaft between the ends of and carrying a U-shaped pen-carrying yoke in combination therewith for sliding motion along the shaft and rotary motion about the shaft, by the improved low-friction, low-play bearing system of the present invention comprising, a pair of annular ball-bearing thrust bearings disposed over the shaft between respective ends of the U-shaped yoke and the moving carriage; and, annular bias spring means disposed over the shaft for creating a linear expansion force resisting play between the moving carriage and the U-shaped yoke.

DESCRIPTION OF THE DRAWINGS

FIG. 1 is a simplified top view of a prior art carriage coupling drive system for a pen plotter.

FIG. 2 is a simplified cutaway drawing through the carriage coupling drive system of FIG. 1.

FIG. 3 is a detailed cutaway drawing through a carriage coupling drive system of the present invention in a representative embodiment thereof.

FIG. 4 is a detailed cutaway drawing through a portion of a carriage coupling drive system of the present invention showing alternate part configurations and placement.

DESCRIPTION OF THE PREFERRED EMBODIMENT

What follows hereinafter is, primarily, a detailed description of one representative embodiment of the present invention as depicted in the drawing of FIG. 3. As those skilled in the art will recognize, the points of novelty incorporated into the present invention could be accomplished in a variety of ways with respect to component shape and positioning within the scope and spirit of the present invention. Wherefore, it is applicant's intent that the specification and appended claims not be limited by virtue of the specific embodiments as described. For convenience, like components from the prior art of FIGS. 1 and 2 have been designated with the same numbers. Similarly, the parts are shown in longitudinal cross-section only as those skilled in the art will recognize that all the components are cylindrical and/or annular and, therefore, their cross-sections define the shape of the whole.

In general, the present invention comprises a pair of annular ball-bearing thrust bearings, generally indicated as 38, disposed over the shaft 14 between respective ends of the U-shaped yoke 16 and the moving carriage 12 and, an annular bias spring 40 disposed over the shaft 14 for creating a linear expansion force resisting play between the moving carriage 12 and the U-shaped yoke 16. The thrust bearings 38 are substantially identical and, therefore, only one description thereof will suffice for both. Each thrust bearing 38 comprises a set of ball bearings 42 disposed around the shaft 14 and between a pair of thrust washers 44, 46. In a tested embodiment, a Hartford model B3-1030 thrust bearing was used as the ball bearings 42 and the thrust washers were formed of 1075 steel which had been ground and polished and had a protective oil applied thereto for rust prevention purposes only. The sleeve bearings 30 within the yoke 16 were retained for sliding and rotary support of the yoke 16 on the shaft 14. In this regard, it should be noted that the present invention is primarily intended to replace the bearing-to-bearing sliding interface at the ends of the sleeve bearings 30, 34 of the prior art. The present invention does not provide sliding or rotary support for either the yoke 16 or the carriage 12. The sleeve bearing 34 of the prior art has been replaced by a pair of sleeve bearings 34' incorporating a dust protecting lip 48 therein which covers and protects the ball bearings 42. Alternatively, a construction as shown in FIG. 4 could be employed wherein the carriage 12 is provided with a recessed area 50 into which the ball bearings 42 are positioned. In such case, the prior art sleeve bearing 34 could be employed.

The ball bearing interface as described above affects a low friction interface, as required; but, it does not eliminate the play, as also required. For that purpose, the bias spring 40 is employed. The bias spring 40 in the preferred embodiment is a wave washer or so-called wave spring. Again with reference to applicant's tested embodiment, the wave washer as employed therein had approximately 250 lb./inch stiffness. A Berg #SV-4 wave washer was employed for the purpose having a free height of 0.050 inch and a compressed height of 0.030 inch for a thrust loading of approximately three to five pounds. This provided sufficient play resistance in use while not affecting the friction at the ball bearing interface. It should be noted that the stiffness of the bias spring 40 (i.e. the wave washer) must be sufficiently high that resonances in the moving carriage 12 are eliminated. Resonances of the carriage 12, of course, would cause the carriage to oscillate longitudinally as the carriage was being moved, causing poor line quality. As shown in FIG. 3, the wave washer bias spring 40 was positioned on the shaft 14 between one of the sleeve bearings 30 and the adjacent outer thrust washer 46. Note that the preferred outer thrust washer 46 has a dust protecting lip 52 formed as part thereof to cover the spring 40. Again with reference to FIG. 4, the bias spring 40 could be positioned on the other side of the ball bearings 42. What is necessary is the creation of a longitudinal expansion force to resist play between the carriage 12 nd the U-shaped yoke 16.

Wherefore, having thus described my invention, I claim:

1. In a carriage coupling drive system for a pen plotter including a moving carriage slidably mounted on a shaft between the ends of and carrying a U-shaped pen-carrying yoke in combination therewith for longitudinal sliding motion along the shaft and rotary motion about the shaft, the improved low-friction, low-play bearing system for supporting and separating the carriage and yoke with minimum longitudinal play between them during longitudinal movement and stopping comprising:
   (a) a pair of annular ball-bearing thrust bearings disposed over the shaft between respective ends of the yoke and the carriage; and
   (b) annular bias spring means disposed over the shaft for creating a longitudinal expansion force between the carriage and yoke on one end of the carriage resisting longitudinal play between the carriage and the yoke.

2. The improved low-friction, low-play bearing system for a carriage coupling drive system of a pen plotter of claim 1 wherein:
   said bias spring means is disposed between the moving carriage and one of said thrust bearings.

3. The improved low-friction, low-play bearing system for a carriage coupling drive system of a pen plotter of claim 1 wherein:
   said bias spring means is a wave washer.

4. The improved low-friction, low-play bearing system for a carriage coupling drive system of a pen plotter of claim 1 and additionally comprising:
   a plurality of thrust washers disposed with a said thrust washer on either side of respective ones of said thrust bearings.

5. The improved low-friction, low-play bearing system for a carriage coupling drive system of a pen plotter of claim 4 wherein:
   said bias spring means is a wave washer disposed between the moving carriage and one of said thrust washers.

6. The improved low-friction, low-play bearing system for a carriage coupling drive system of a pen plotter of claim 4 wherein:
   said bias spring means is a wave washer disposed between the U-shaped yoke and one of said thrust washers.

7. The improved low-friction, low-play bearing system for a carriage coupling drive system of a pen plotter of claim 3 wherein:
   said wave washer is of sufficient stiffness to resist resonances of the moving carriage as the moving carriage and U-shaped yoke are moved longitudinally in combination.

8. The improved low-friction, low-play bearing system for a carriage coupling drive system of a pen plotter of claim 7 wherein:
   said wave washer is of a stiffness to impart a thrust loading between the moving carriage and U-shaped yoke of three to five pounds.

9. The improved low-friction, low-play bearing system for a carriage coupling drive system of a pen plotter of claim 7 wherein:
   said wave washer is of a stiffness of approximately 250 pounds per inch.

* * * * *